United States Patent
Scott, IV

(10) Patent No.: US 8,966,832 B1
(45) Date of Patent: Mar. 3, 2015

(54) MOBILE ABOVEGROUND SHELTER WITH PROTECTED ANCHORING

(71) Applicant: Oscar T. Scott, IV, Amarillo, TX (US)

(72) Inventor: Oscar T. Scott, IV, Amarillo, TX (US)

(73) Assignee: Oscar T. Scott, IV, Amarillo, TX (US)

( * ) Notice: Subject to any disclaimer, the term of this patent is extended or adjusted under 35 U.S.C. 154(b) by 0 days.

(21) Appl. No.: 14/251,367

(22) Filed: Apr. 11, 2014

(51) Int. Cl.
| | |
|---|---|
| *E04F 13/07* | (2006.01) |
| *E04F 13/072* | (2006.01) |
| *E04H 9/14* | (2006.01) |
| *E04H 9/16* | (2006.01) |
| *E04H 1/12* | (2006.01) |
| *E02D 27/50* | (2006.01) |
| *E04B 1/32* | (2006.01) |
| *E04B 1/342* | (2006.01) |

(52) U.S. Cl.
CPC .. *E04H 9/14* (2013.01); *E04H 9/16* (2013.01); *E04H 1/1205* (2013.01); *E02D 27/50* (2013.01); *E04B 1/32* (2013.01); *E04B 1/342* (2013.01)
USPC ...... 52/80.1; 52/84; 52/64; 52/72; 52/745.05; 135/118

(58) Field of Classification Search
CPC ........... E04H 9/14; E04F 13/07; E04F 13/072
USPC .......... 52/3, 4, 72, 64, 79.5, 79.9, 79.13, 143, 52/79.1, 8.5, 834; 135/118
See application file for complete search history.

(56) References Cited

U.S. PATENT DOCUMENTS

| | | | |
|---|---|---|---|
| 1,122,375 A | 12/1914 | Engle | |
| 1,122,431 A | 12/1914 | Sexton | |
| 1,689,426 A | 10/1928 | Knapen | |
| 2,306,537 A | * 12/1942 | Hamm | 135/88.1 |
| D136,060 S | 7/1943 | Crowe | |
| 2,363,917 A | 11/1944 | Waterman et al. | |
| 2,427,937 A | 9/1947 | Willson | |
| D152,968 S | 3/1949 | Hewlett | |
| 2,750,204 A | * 6/1956 | Ohrmann | 280/755 |
| 2,765,499 A | 10/1956 | Couse | |
| RE24,895 E | 11/1960 | Clements | |
| 2,976,875 A | 3/1961 | Hoffman | |
| 3,170,472 A | 2/1965 | Cushman | |
| 3,302,552 A | 2/1967 | Walsh | |

(Continued)

FOREIGN PATENT DOCUMENTS

| | | |
|---|---|---|
| JP | 03241129 A | 10/1991 |
| WO | 9317208 A1 | 9/1993 |

OTHER PUBLICATIONS

Photographs of prior art shelters, Mar. 2014.

(Continued)

*Primary Examiner* — Phi A

(74) *Attorney, Agent, or Firm* — Brian F Russell; Russell Ng PLLC

(57) ABSTRACT

A protective shelter includes an enclosure having at least a floor, at least one sidewall coupled to the floor, a protected opening in the at least one sidewall, and a roof coupled to the at least one sidewall. The protective shelter includes a plurality of attachment fixtures each coupled to at least one of a set including the sidewall and the roof and a plurality of recesses at the at least one sidewall. Each of the plurality of recesses is sized to receive therein an anchoring assembly coupled to one of the plurality of attachment fixtures and couplable to a respective anchoring device on an underlying substrate.

16 Claims, 8 Drawing Sheets

(56) References Cited

U.S. PATENT DOCUMENTS

| | | | |
|---|---|---|---|
| 3,335,529 A | 8/1967 | Gedney | |
| 3,342,444 A | 9/1967 | Nelson | |
| 3,429,767 A | 2/1970 | Pincus | |
| 3,509,811 A | 5/1970 | Topp | |
| D221,140 S | 7/1971 | Wood | |
| 3,601,934 A | 8/1971 | Dietz | |
| 3,685,426 A | 8/1972 | Rosa | |
| 3,726,054 A * | 4/1973 | Anderson et al. | 52/23 |
| 3,788,207 A | 1/1974 | Doherty, II | |
| 3,797,283 A * | 3/1974 | Honer | 70/58 |
| 3,798,851 A | 3/1974 | Utahara | |
| 3,817,009 A | 6/1974 | Elder | |
| 3,828,491 A | 8/1974 | Koon et al. | |
| 3,893,383 A | 7/1975 | Jones | |
| 3,943,671 A | 3/1976 | Curci | |
| 3,984,947 A | 10/1976 | Patry | |
| 4,007,833 A * | 2/1977 | Bigelow, Jr. | 206/321 |
| 4,016,730 A | 4/1977 | DeVilliers | |
| 4,033,078 A * | 7/1977 | Prewer | 52/79.5 |
| 4,160,340 A | 7/1979 | Levett | |
| 4,162,597 A | 7/1979 | Kelly | |
| 4,223,486 A | 9/1980 | Kelly | |
| 4,258,511 A | 3/1981 | Strain | |
| 4,268,066 A | 5/1981 | Davis | |
| 4,438,606 A | 3/1984 | Chardon et al. | |
| 4,512,243 A | 4/1985 | Ballard et al. | |
| 4,538,508 A | 9/1985 | Ballard | |
| 4,557,081 A | 12/1985 | Kelly | |
| 4,593,504 A | 6/1986 | Bonnici et al. | |
| 4,596,181 A | 6/1986 | Kolt | |
| 4,608,792 A | 9/1986 | Gerber | |
| 4,635,412 A | 1/1987 | Le Poittevin | |
| 4,641,571 A | 2/1987 | Anderson et al. | |
| 4,652,321 A | 3/1987 | Greko | |
| 4,653,238 A | 3/1987 | Berman | |
| 4,759,272 A | 7/1988 | Zaniewski | |
| 4,788,802 A | 12/1988 | Wokas | |
| 4,794,717 A | 1/1989 | Horsmann | |
| D299,753 S | 2/1989 | Virgilio | |
| 4,803,111 A | 2/1989 | Mansell | |
| 4,843,794 A | 7/1989 | Holtgreve | |
| 4,848,653 A | 7/1989 | Van Becelaere | |
| 4,850,166 A | 7/1989 | Taylor | |
| 4,854,094 A | 8/1989 | Clark | |
| 4,876,950 A | 10/1989 | Rudeen | |
| 4,888,930 A | 12/1989 | Kelly | |
| 4,909,135 A | 3/1990 | Greko | |
| 4,963,761 A | 10/1990 | Wight | |
| 4,965,971 A | 10/1990 | Jean-Jacques et al. | |
| 5,009,149 A | 4/1991 | MacLeod et al. | |
| 5,094,048 A * | 3/1992 | Woo | 52/143 |
| 5,431,240 A | 7/1995 | Merritt | |
| D369,670 S | 5/1996 | Queen | |
| 5,734,215 A | 3/1998 | Taghezout et al. | |
| 5,749,780 A | 5/1998 | Harder et al. | |
| 5,766,071 A | 6/1998 | Kirkwood | |
| 5,769,011 A | 6/1998 | Daniel | |
| 5,791,090 A * | 8/1998 | Gitlin et al. | 52/4 |
| D397,800 S | 9/1998 | Acevedo-Arjona et al. | |
| 5,819,477 A * | 10/1998 | Gaffney | 52/23 |
| 5,829,200 A * | 11/1998 | Jones et al. | 52/3 |
| D415,571 S | 10/1999 | Goldwitz | |
| 5,966,956 A | 10/1999 | Morris et al. | |
| 6,006,482 A | 12/1999 | Kelly | |
| 6,032,421 A | 3/2000 | Yamada | |
| 6,325,712 B1 | 12/2001 | Lawless, III et al. | |
| 6,484,459 B1 | 11/2002 | Platts | |
| 6,591,564 B2 | 7/2003 | Cusimano | |
| 6,615,551 B2 * | 9/2003 | Chesser et al. | 52/36.4 |
| D490,533 S | 5/2004 | Lockwood | |
| 6,837,006 B2 * | 1/2005 | Deskin | 52/3 |
| 7,001,266 B2 | 2/2006 | Jones et al. | |
| 7,036,786 B1 | 5/2006 | Schura | |
| D568,495 S | 5/2008 | Kennedy et al. | |
| 7,373,757 B2 | 5/2008 | Hampel | |
| 7,543,594 B2 | 6/2009 | Novak | |
| 7,717,290 B2 * | 5/2010 | Gerding | 220/629 |
| 7,926,240 B1 | 4/2011 | Jacovitz | |
| 7,937,895 B2 | 5/2011 | Janka et al. | |
| 8,136,303 B2 | 3/2012 | Scott, IV | |
| 8,245,450 B2 | 8/2012 | Scott | |
| 8,322,084 B2 | 12/2012 | Kestermann | |
| 8,375,642 B1 | 2/2013 | Scott, IV | |
| D685,921 S | 7/2013 | Scott, IV | |
| 8,534,001 B2 | 9/2013 | Scott, IV | |
| 2003/0024173 A1 | 2/2003 | Cohen | |
| 2003/0126805 A1 | 7/2003 | Roberts | |
| 2004/0123529 A1 | 7/2004 | Wiese et al. | |
| 2005/0166477 A1 | 8/2005 | Chu | |
| 2005/0235819 A1 | 10/2005 | Long | |
| 2006/0016134 A1 | 1/2006 | Luchinger et al. | |
| 2006/0048458 A1 | 3/2006 | Donald et al. | |
| 2007/0094943 A1 | 5/2007 | Deisenroth et al. | |
| 2008/0060691 A1 | 3/2008 | Harker | |
| 2008/0313974 A1 | 12/2008 | Kmet et al. | |
| 2009/0031621 A1 | 2/2009 | Kitagawa | |
| 2009/0217600 A1 | 9/2009 | De Azambuja | |
| 2010/0043308 A1 | 2/2010 | Keeble | |
| 2010/0320708 A1 | 12/2010 | Pope | |
| 2011/0067321 A1 | 3/2011 | Hijazi | |
| 2011/0083380 A1 | 4/2011 | Thomas | |
| 2012/0151851 A1 | 6/2012 | Cantin et al. | |
| 2012/0192503 A1 | 8/2012 | Connell | |

OTHER PUBLICATIONS

Oscar T. Scott IV, U.S. Appl. No. 12/579,004, Non-Final Office Action dated Feb. 1, 2011.
Oscar T. Scott IV, U.S. Appl. No. 12/579,004, Final Office Action dated Jun. 14, 2011.
Oscar T. Scott IV, U.S. Appl. No. 12/579,004, Notice of Allowance dated Dec. 1, 2011.
Oscar T. Scott IV, U.S. Appl. No. 13/328,000, Notice of Allowance dated Apr. 5, 2012.
Oscar T. Scott IV, U.S. Appl. No. 13/540,795, Notice of Allowance dated Dec. 20, 2012.
Oscar T. Scott IV, U.S. Appl. No. 13/743,942, Restriction Requirement dated Apr. 15, 2013.
Oscar T. Scott IV, U.S. Appl. No. 13/743,942, Non-Final Office Action dated May 10, 2013.
Oscar T. Scott IV, U.S. Appl. No. 13/743,942, Notice of Allowance dated Jun. 10, 2013.
Oscar T. Scott IV, U.S. Appl. No. 29/443,443, Non-Final Office Action dated Apr. 1, 2013.
Oscar T. Scott IV, U.S. Appl. No. 29/443,443, Notice of Allowance dated May 21, 2013.
Oscar T. Scott IV, U.S. Appl. No. 13/917,851, Non-Final Office Action dated Oct. 18, 2013.

* cited by examiner

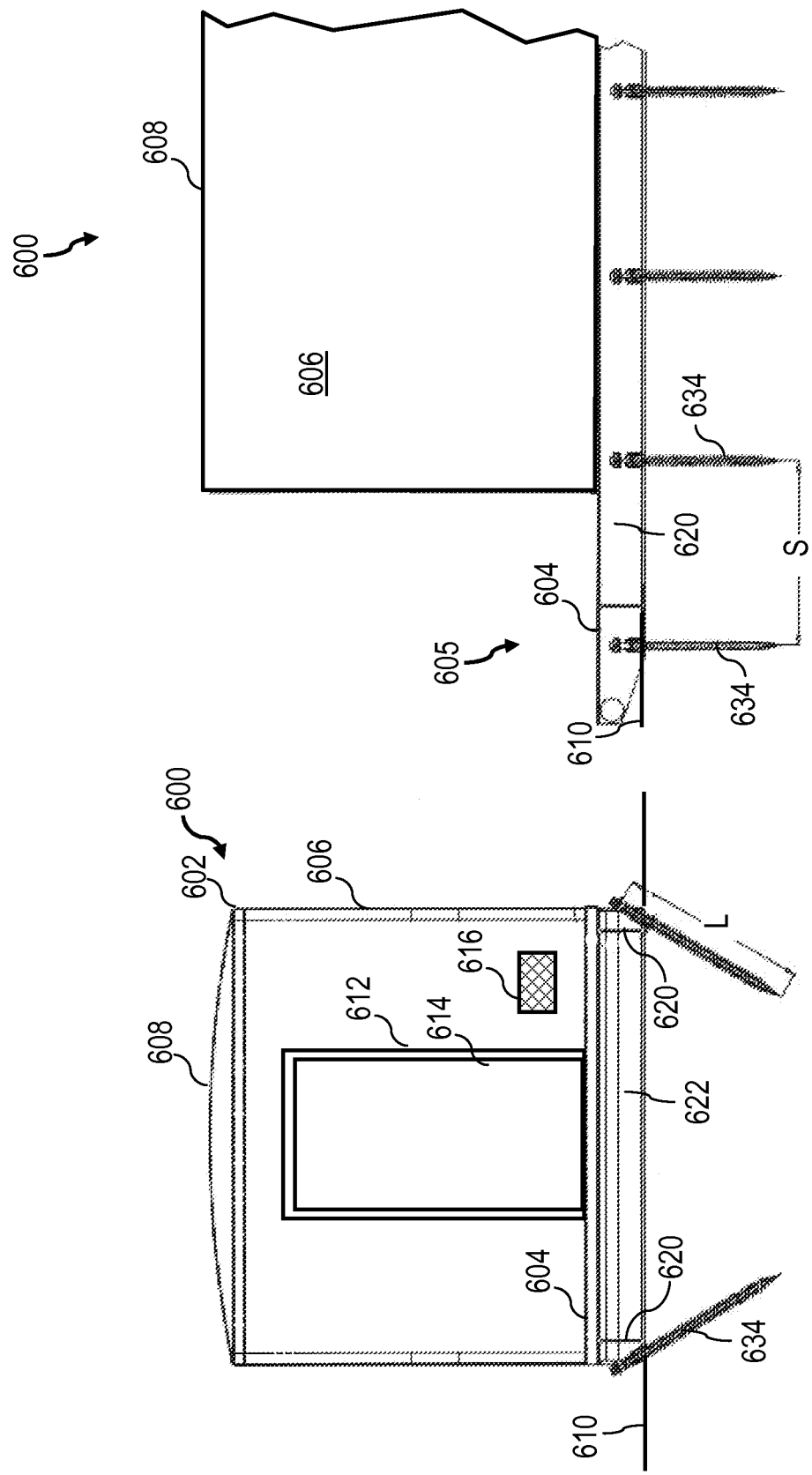

MOBILE ABOVEGROUND SHELTER WITH PROTECTED ANCHORING

BACKGROUND OF THE INVENTION

1. Technical Field:

The present invention relates generally to protective shelters, and more particularly to redeployable mobile aboveground shelters with protected anchoring.

2. Description of the Related Art:

The construction of storm shelters, safe rooms and blast resistant modules is well known and thoroughly documented, for example, in FEMA 320, Third Edition and FEMA 361, Second Edition, both available from the Federal Emergency Management Agency (FEMA), as well as in ICC/NSSA 2008 "Standard for the Design and Construction of Storm Shelters," published jointly by the International Code Council (ICC) and the National Storm Shelter Association (NSSA) and in Section 6, Wind Loads, of "Minimum Design Loads for Buildings and Other Structures," SEI/ASCE 7-05, 2005, ISBN: 0-7844-0809-2, published by the American Society of Civil Engineers.

To meet safety standards, conventional shelters require either burial below ground or securement of an aboveground shelter to the ground in a manner that will afford the desired personnel protection. One challenge in protecting personnel located where severe wind events and other environmental hazards may occur is that the personnel are often stationed in such locations only temporarily and then moved to other locations. For example, crews working on drilling rigs, pipeline construction, wind turbine erection, petroleum refineries, compressor station repair, and road construction and repair are examples of frequently moved personnel that benefit from the protection provided by shelters. In many cases, use of below ground shelters is not practical, as they cannot easily, quickly and inexpensively be relocated to different work sites as work crews relocate.

Consequently, in many cases, it would be desirable to protect crews using aboveground shelters. One common aboveground shelter design fastens the shelter by numerous metal bolts or adhesives to a heavy foundation or concrete "pad". For such pad-anchored aboveground shelters, the combined weight of the shelter plus its foundation or pad is often the primary factor relied upon to resist movement of the shelter (and thus provide protection of its occupants) during high velocity wind events. To a lesser degree, the large width of the required concrete foundation also helps the assembly resist overturning. Although pre-cast concrete community and industrial shelters are available, their immense weight (approximately 75,000 lbs. or more) requires the use of specially permitted and oversized trucks to haul them and heavy cranes to lift them into place, which renders their temporary redeployment impractical. Some conventional metal shelters can be unbolted from their heavy concrete foundations and moved more easily. However, each new location requires the preparation of another heavy concrete pad to which the shelter can be bolted. In most instances the cost and inconvenience of pouring a new pad (and the attendant environmental impact of the pad's subsequent demolition and removal) renders impracticable the redeployment of a pad-anchored protective shelter for temporary use.

A second type of aboveground shelter is an "anchored box" design that utilizes one or more exposed anchoring assemblies, including wire rope, steel cable, chains, turnbuckles, webbing straps and/or other type of securing cables to provide stability in high wind loads to a lightweight enclosure. FIG. 1 illustrates a typical installation of an aboveground shelter 100 employing an anchored box design. In this case, aboveground shelter 100 includes a metal or concrete enclosure 102 that is tethered to the underlying substrate 104 (e.g., the earth's surface) via multiple (in this example, four) anchoring assemblies 106. In various implementations, anchoring assemblies 106 are looped over and/or attached to enclosure 102 (e.g., via attachment rings 108) and also anchored to substrate 104 using any of a variety of anchoring devices 110, such as helical earth screws, driven piles, or bored holes filled with cement fitted with "eyes." In the illustrated example, each anchoring assembly 106 includes a non-rigid component 112 (wire rope, steel cable or webbing strap) and a turnbuckle 114 that can be used to tension the anchoring assembly 106 and thus increase the effective weight of metal enclosure 102 and its resistance to movement in high winds.

It should be noted that in a typical installation, distance D1, which represents the effective height of the attachment point of anchoring assemblies 106 to metal enclosure 102, is approximately equal to distance D2, which is the distance along substrate 104 between the anchoring devices and the base of enclosure 102. However, given the variability of different installation locations and different installers, the angle A formed between anchoring assemblies 106 and substrate 104 commonly varies between 15 degrees to 60 degrees, with an angle of 45 degrees commonly considered to be optimal for resistance to wind-induced overturning, uplift and sliding forces on enclosure 102.

SUMMARY OF THE INVENTION

In one embodiment, a protective shelter includes an enclosure having at least a floor, at least one sidewall coupled to the floor, a protected opening in the at least one sidewall, and a roof coupled to the at least one sidewall. The protective shelter includes a plurality of attachment fixtures each coupled to at least one of a set including the sidewall and the roof and a plurality of recesses at the at least one sidewall. Each of the plurality of recesses is sized to receive therein an anchoring assembly coupled to one of the plurality of attachment fixtures and couplable to a respective anchoring device on an underlying substrate.

Additional embodiments are disclosed herein.

BRIEF DESCRIPTION OF THE DRAWINGS

FIGS. 6A-6C depict a section view, a partial elevation view, and a detailed section view of a sixth embodiment of an aboveground shelter having protected anchoring.

DETAILED DESCRIPTION OF ILLUSTRATIVE EMBODIMENT

Although the conventional anchored box aboveground shelter design described above with reference to FIG. 1 affords a greater degree of shelter mobility than conventional pad-anchored shelter designs, conventional anchored box aboveground shelter designs place shelter occupants at high risk of injury as a result of impact-induced failure of the anchoring provided by the exposed anchoring assemblies. For example, if a anchoring assembly includes a tensioned ¾ inch steel cable that is impacted by an object weighing 25 lbs. (approximately 11.4 kg) and traveling at a velocity of 100 mph, the anchoring provided by the anchoring assembly can fail, leaving the aboveground shelter vulnerable to wind-induced overturning, uplift and/or sliding and exposing shelter occupants to great risk of serious bodily injury and/or death. The failure of the anchoring can include one or more specific modes of failure, including rupture of the steel cable itself, failure of another component of the anchoring assembly (D-ring, shackle, turnbuckle, etc.), pull-out of an anchoring device attached to the anchoring assembly, breakage of an attachment fixture that couples the anchoring assembly to the shelter body, etc. Anchoring assemblies are particularly subject to impact-induced failure if turnbuckles are included as an element of the anchoring assemblies, as turnbuckles commonly have a lower minimum breaking strength under both tension and shear forces than braided wire cables or other components of the anchoring assemblies.

Accordingly, in various embodiments, an aboveground protective shelter is provided that reduces risk to shelter occupants by providing protected anchoring.

Figure 2:
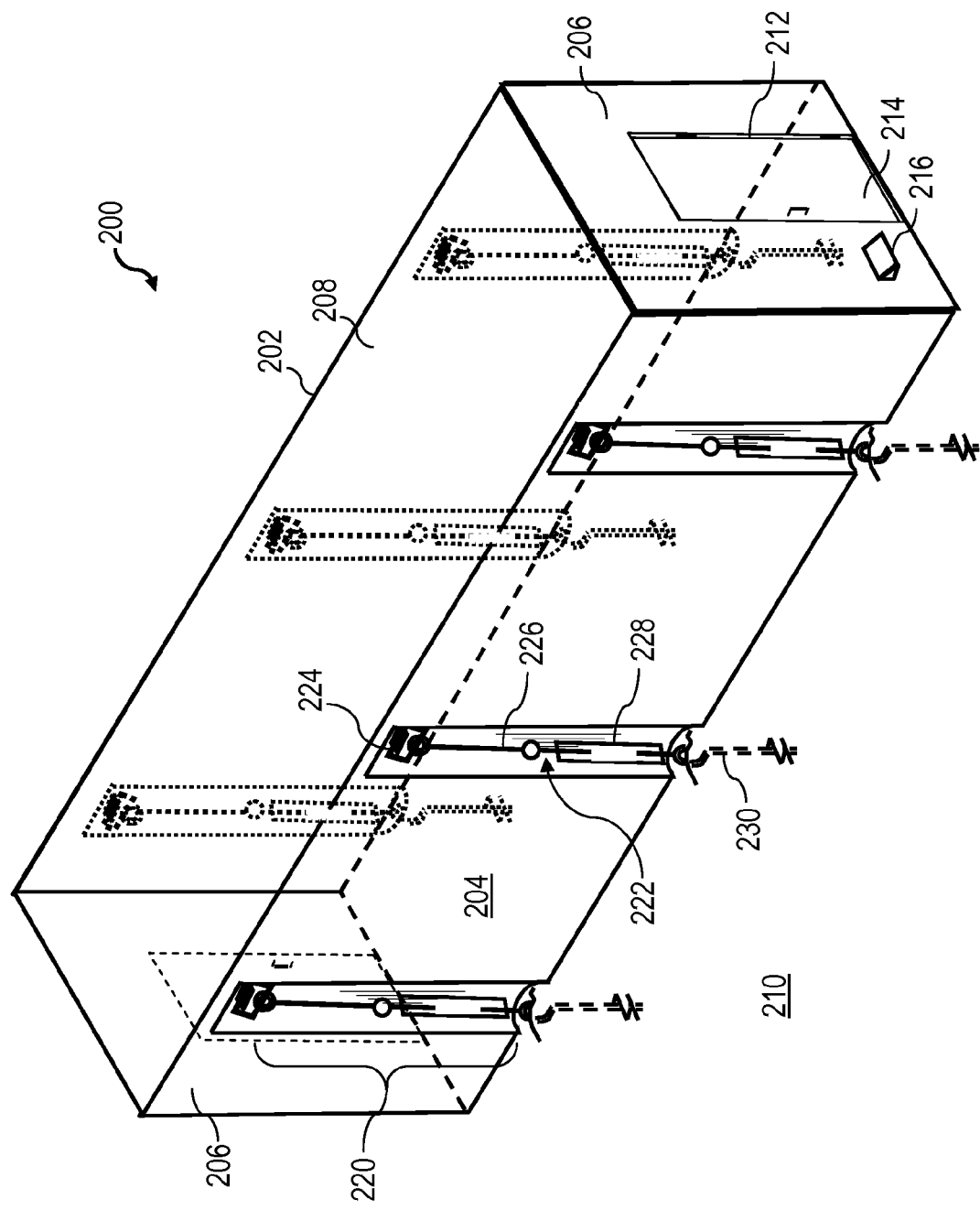
FIG. 2 is a perspective view of a first embodiment of an aboveground protective shelter having protecting anchoring as seen from above.

With reference now to FIG. 2, there is illustrated a perspective view of a first embodiment of an aboveground protective shelter 200 having protecting anchoring as seen from above. Protective shelter 200 can be, for example, a oil field "dog house," a change house, a cooling room, a safe room, a construction trailer, a tool house, a bunk house, or the like.

In an exemplary implementation, protective shelter 200 includes an enclosure 202 constructed of formed reinforced concrete and/or welded, reinforced steel (or steel alloy) plate of sufficient strength to protect the occupants and contents of protective shelter 200 from environmental hazards, such high-velocity wind events, impact by wind-borne debris, blast waves, and/or lightning. In the depicted embodiment, enclosure 202 has a generally rectangular prismatic shape having a floor 204, four sidewalls 206, and a roof 208 all formed of reinforced steel plate that is welded to form substantially air-tight connections between members. In other embodiments, enclosure 202 may have different shapes, including, for example, ones with one or more curved sidewalls. That is, the supporting walls can have any plan configuration forming a substantially enclosed volume (e.g., square, rectangular, cylindrical, hexagonal, octagonal, irregular, etc. when viewed in plan). Further, it should be understood that virtually any shape and style of roof (e.g., flat, domed, round, parapet, hip, gable, mansard, etc.) can be utilized in the various embodiments of the disclosed protective shelter. The height of enclosure 202 can also vary between embodiments, with shorter heights generally being preferred because the overturning force on the windward wall varies with the square of the height if all other factors remain constant. A typical height of enclosure 202 is between 72 and 96 inches.

Although virtually any shape of enclosure 202 can be employed, the presently preferred shapes and sizes fall within state and federal Department of Transportation (DOT) height, width, length and weight limits for non-permitted loads on public roadways. For example, one preferred shape is a rectangular prism that, due to its geometry, affords maximum refuge space for occupants, and that, when loaded on its transport device, has a height, width, length and weight that do not exceed DOT limits.

In any of these various shapes, enclosure 202 can be made, for example, of welded A36, ¼ steel plate with unillustrated reinforcing ribs of sufficient size, placement and design to meet or exceed deflection and penetration limits established by the National Storm Shelter Association (NSSA) Standard, the Federal Emergency Management Agency (FEMA) Guidelines, the American Society of Civil Engineers (ASCE) standards and/or the ICC/NSSA 500 Standard. Lesser or greater material thicknesses, types, and strengths can alternatively be used.

In some embodiments, the lower surface of floor 204 of enclosure 202 rests directly upon substrate 210. In other embodiments, floor 204 is supported above the underlying substrate 210 (e.g., ground, pavement, rig platform, etc.) when protective shelter 202 is deployed by one or more supports. For example, floor 202 may be welded to and rest upon one or more undercarriage beams or rails that elevate floor 204 above substrate 210.

To permit ingress of personnel into and egress of personnel from the interior volume of enclosure 202, one or more (and preferably at least two) openings 212 are formed in sidewall(s) 206. Openings 212 are preferably protected (e.g., by an alcove or baffled entry system or by a security door) to prevent the intrusion of wind-borne debris into the interior volume of enclosure 202. For example, in the illustrated embodiment, each opening 212 is protected by a hinged security door 214 that, upon being securely closed, isolates personnel and contents within enclosure 202 from external threats. Roof 208 may also have at least one escape opening to permit egress from enclosure 202 in the event a security door 214 becomes inoperable or otherwise blocked, as specified by ICC500/NSSA 2008 Standard. One or more of sidewalls 206 may be further provided with shielded ventilation and pressure relief openings 216 of sufficient size to provide sufficient breathing air for the rated number of shelter occupants and pressure relief of the internal volume of enclosure 202 in accordance with the ICC/NSSA 500 Standard.

As further shown in FIG. 2, enclosure 202 is coupled to anchoring devices 230 embedded in substrate 210 by multiple anchoring assemblies 220. The number and placement of anchoring devices 230 and anchoring assemblies 220 is preferably selected to ensure that protective shelter 202 can resist overturning, sliding and uplift under the forces of a rated wind speed (e.g., 250 mph or 300 mph). Although each anchoring assembly 220 may be composed of one or more of a variety of components, in the illustrated embodiment, each anchoring assembly 220 includes a non-rigid line 226 (e.g., wire rope, steel cable or webbing strap), a turnbuckle 228, and one or more D-rings, shackles and other connecting devices. It should be noted that the relative positions in which the constituent elements of anchoring assemblies are coupled is unimportant (e.g., turnbuckle 228 is equally effective placed either above or below non-rigid line 226); however, it is preferred if wire rope or steel cable is employed as an element of anchoring assemblies 220 because of its inherent ability to stretch and therefore tolerate shock-loading better than solid metal elements such as chains, shackles, D-rings and turnbuckles.

Figure 1:
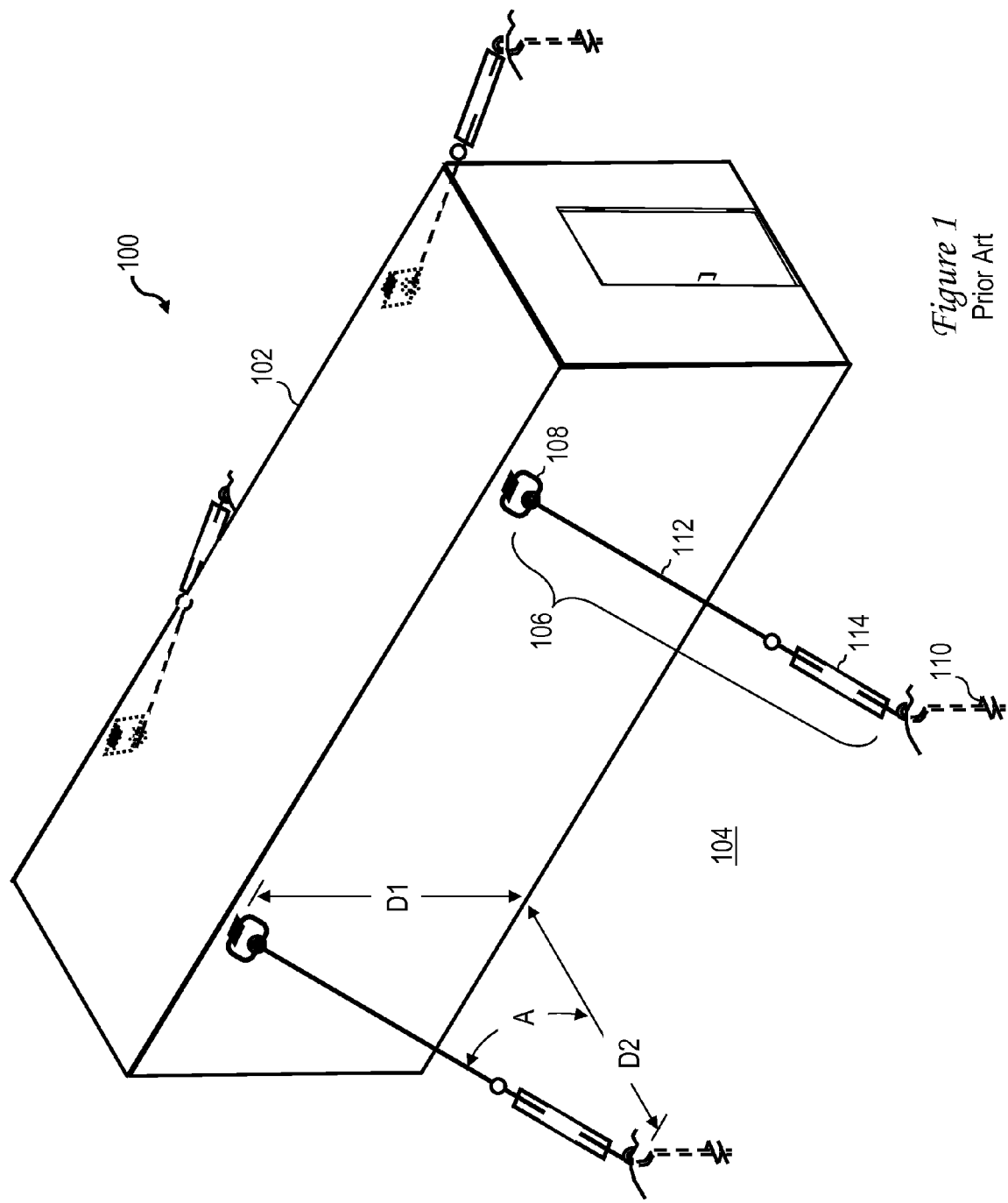
FIG. 1 is a perspective view of a conventional aboveground protective shelter employing an anchored box design having unprotected anchoring.

In contrast to anchoring assemblies 106 of conventional aboveground shelter 100 of FIG. 1, anchoring assemblies 220 of aboveground shelter 200 of FIG. 2 are protected from impact by wind-borne debris (as well as from site-specific laydown, collapse and rollover hazards), in this case by respective recesses 222 formed in sidewalls 206 of enclosure 202. Recesses 222 can have any configuration suitable for receiving and protecting a anchoring assembly 220 such as substantially semi-cylindrical (as shown), rectangular, etc. Although not required in all implementations, in the illustrated embodiment, each recess 222 also houses an attachment fixture for a anchoring assembly 220, such as an attachment ring 224, which can be, for example, welded or bolted to an interior surface of the recess. In other embodiments, one or more attachment fixtures may be disposed on sidewalls 206 outside of recesses 220 and/or on roof 208.

As shown, each anchoring assembly 220 is additionally coupled to a respective anchoring device 230, such as a helical earth anchor, earth screw, driven pile, or a bored hole filled with cement fitted with an "eye." As will be appreciated, the number and holding strength of anchoring devices 230 required to resist sliding, uplift and overturning of protective shelter 10 will vary between shelter embodiments and installation conditions. For example, for heavier shelter embodiments (e.g., 20,000 lbs.) or for dense compacted clay soils, shorter anchoring devices 230 exhibiting less holding strength can be employed. For lighter shelter embodiments (e.g., 12,000 lbs.) or for sandy or loamy soils, longer anchoring devices 230 exhibiting greater holding strength are preferably employed. It should be noted that anchoring devices 230 are preferably installed in substrate 210 close to sidewall 206 and, although not required, the exposed portion of anchoring devices 230 may also be disposed within recesses 222.

While not absolutely preventing impact-induced failure of one or more anchoring assemblies 220, the illustrated embodiment greatly reduces the likelihood of such a failure by partially shielding anchoring assemblies 220 from (and reducing exposure of anchoring assemblies 220 to) impact from wind-borne debris and from site-specific collapse, laydown, and rollover hazards.

Figure 3:
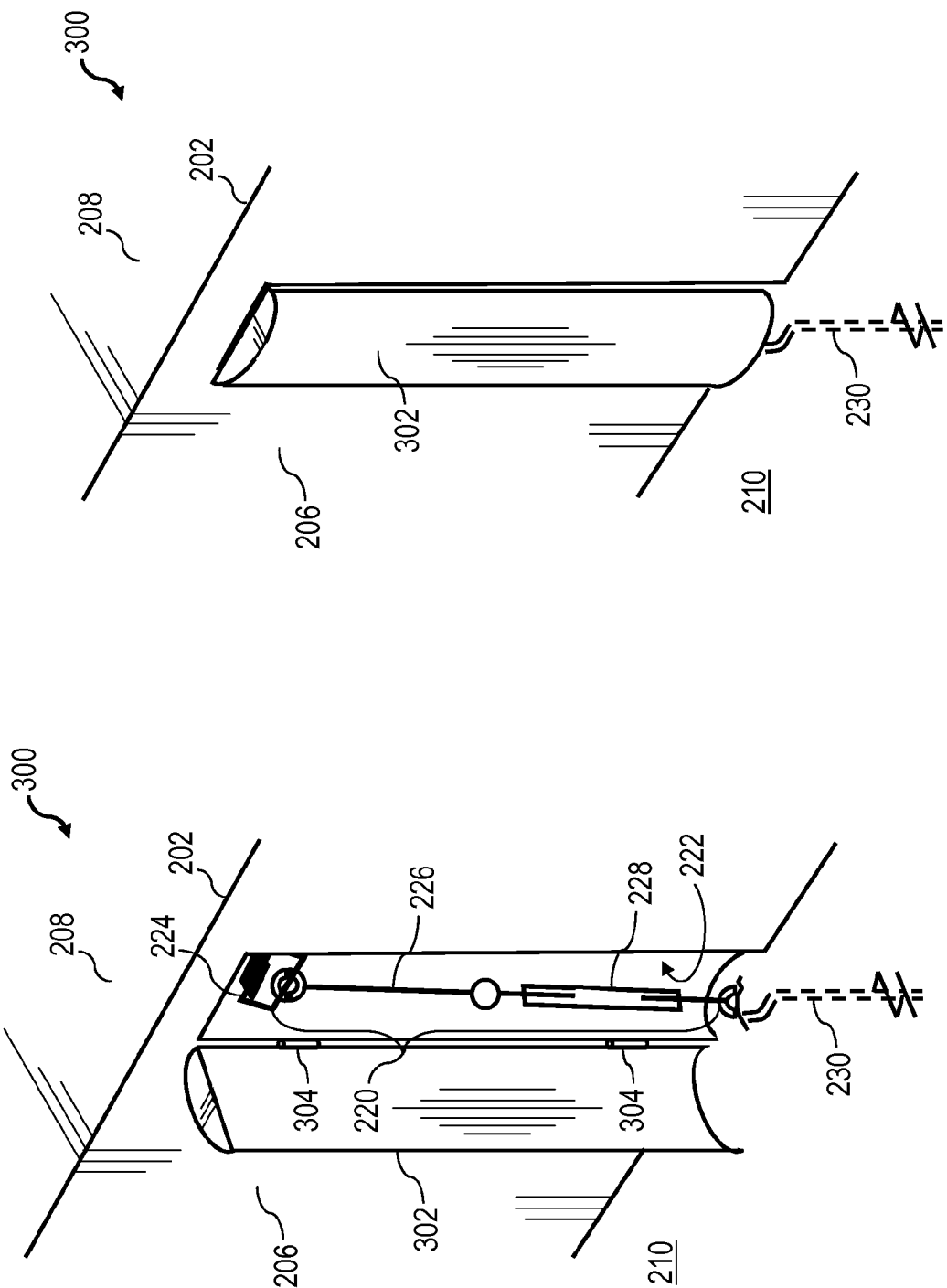
FIGS. 3A-3B are detailed perspective views of an aboveground shelter having protected anchoring in accordance with a second embodiment.

Referring now to FIGS. 3A-3B, there are illustrated detailed perspective views of an aboveground shelter 300 having protected anchoring in accordance with a second embodiment. The second shelter embodiment illustrated in FIGS. 3A-3B is configured like the first shelter embodiment shown in FIG. 2, but provides further protection for one or more of the anchoring assemblies 220 by providing a respective protective cover 302 that encloses each of the one or more anchoring assemblies 220. In the illustrated embodiment, protective cover 302 is coupled by one or more hinges 304 to sidewall 206. When protective cover 302 is in an open position, as shown in FIG. 3A, an anchoring device 230 can be installed adjacent to or within recess 222, and an anchoring assembly 220 can be coupled to anchoring device 230 and appropriately tensioned, for example, by tightening turnbuckle 228. Thereafter, protective cover 302 can be rotated to a closed position, as shown in FIG. 3B, to protect anchoring assembly 220 from impact-induced failure. It should be appreciated that in some embodiments, protective cover 302 and/or enclosure 202 can be provided with a latching mechanism to secure protective cover 302 in the closed position. It should also be appreciated that in alternative embodiments of protective shelter 300, one or more of recesses 222 can be omitted (e.g., the relevant portions of sidewalls 206 can be planar), and anchoring assemblies 220 can be protected in the recesses formed between protective covers 302 and sidewalls 206.

Figure 4:
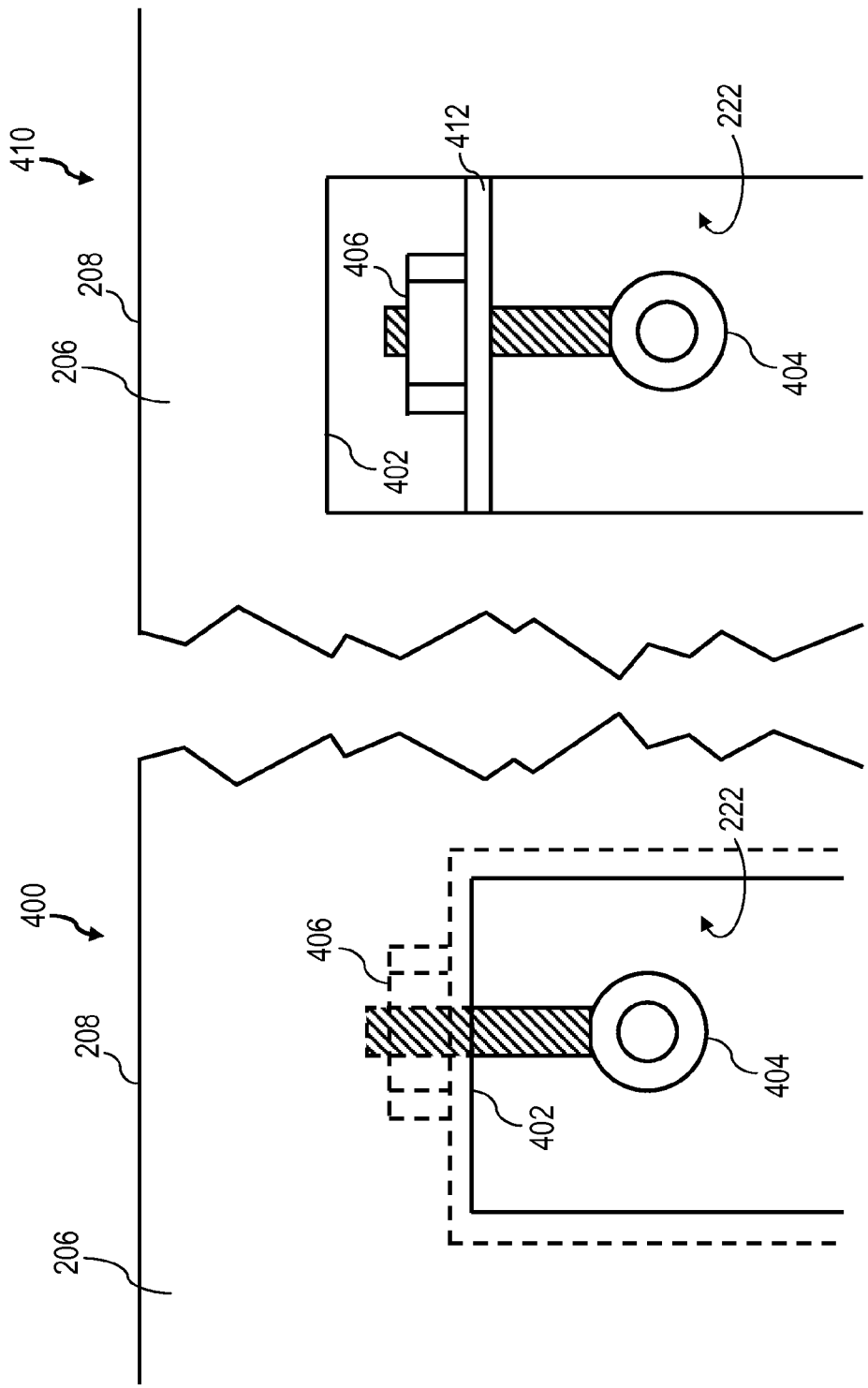
FIGS. 4A-4B are detailed elevation views of aboveground shelters having protected anchoring in accordance with a third and fourth embodiments.

With reference now to FIGS. 4A-4B, there are illustrated detailed elevation views of third and fourth embodiments of an aboveground shelter. As indicated by like reference numerals, the third and fourth embodiments depicted in FIGS. 4A-4B are configured like one of the first or second shelter embodiments shown in FIG. 2 and FIGS. 3A-3B, except that the third and fourth embodiments include alternative attachments for anchoring assemblies 220 (not shown).

In particular, in the third embodiment of FIG. 4A, a protective shelter 400 includes a recess 222 defined at its upper extent by a substantially horizontal top plate 402. Top plate 402, which serves as an attachment fixture, has a through hole formed there through, which in this embodiment communicates with the interior volume of protective shelter 400. A coupling device, such as threaded eye bolt 404, can be installed and retained in the through hole by a complementary fastener, such as threaded nut 406. An anchoring assembly 220 as previously described can be attached between eye bolt 404 and an anchoring device 230 embedded in substrate 210, and then tensioned, if desired, by rotation of eye bolt 404 and/or nut 406.

The fourth embodiment of FIG. 4B is similar to that depicted in FIG. 4A, but provides access from the exterior of the protective shelter to the fastener that retains the coupling device for the anchoring assembly. In the fourth embodiment, protective shelter 410 includes a recess 222 having an intermediate plate 412 fixed (e.g., welded) within recess 222 and spaced from top plate 402. Intermediate plate 412 has a through hole formed there through. A coupling device, such as threaded eye bolt 404, can be installed and retained in the through hole by a complementary fastener, such as threaded nut 406. An anchoring assembly 220 as previously described can be attached between eye bolt 404 and an anchoring device 230 embedded in substrate 210, and then tensioned, if desired, by rotation of eye bolt 404 and/or nut 406 from the exterior of protective shelter 410.

Figure 5:
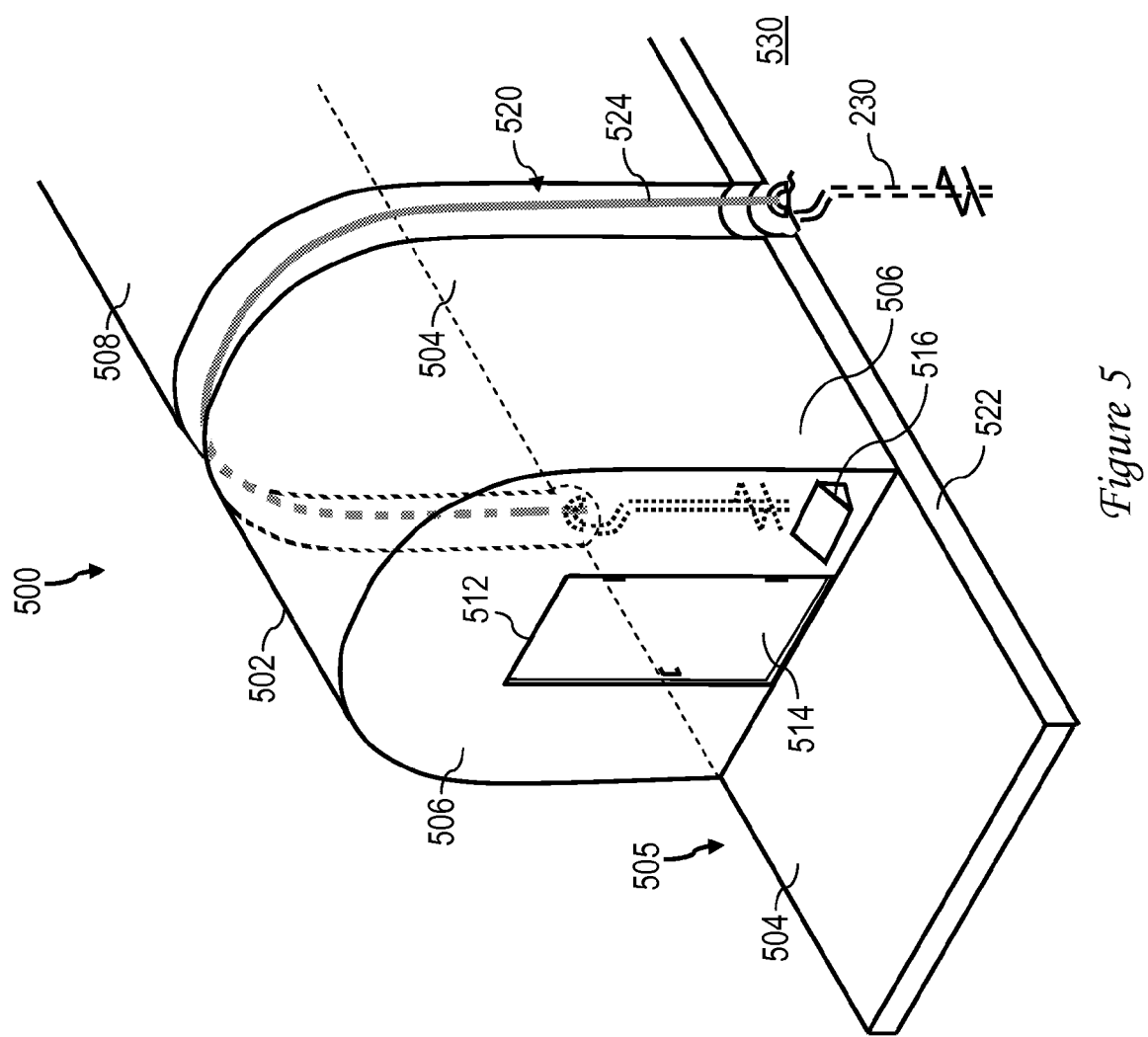
FIG. 5 is a perspective view of an aboveground shelter having protected anchoring in accordance with a fifth embodiment.

Referring now to FIG. 5, there is depicted a perspective view of a fifth embodiment of an aboveground shelter 500 having protected anchoring. In the depicted embodiment, aboveground protective shelter 500 includes an enclosure 502 having a floor 504, four sidewalls 506, and a roof 508 (in this case a curved roof), all formed of reinforced steel plate that is welded to form substantially air-tight connections between members. In the illustrated embodiment, floor 504 extends beyond enclosure 502 to form porches 505 extending from opposing ends of enclosure 502 along its long axis.

To permit ingress of personnel into and egress of personnel from the interior volume of enclosure 502, one or more (and preferably at least two) protected openings 512 are formed in sidewall(s) 506. As discussed above, opening(s) 512 can be protected by a hinged security door 514. Sidewalls 606 may be further provided with shielded ventilation and pressure relief opening(s) 516 of sufficient size to provide sufficient breathing air for the rated number of shelter occupants and pressure relief of the internal volume of enclosure 502 in accordance with the ICC/NSSA 500 Standard.

In the illustrated embodiment, one or more continuous recesses 520 are formed in opposing sidewalls 506 and roof 508. Although not required, one or more of recesses 520 may further extend through the undercarriage 522, which may be formed, for example, of one or more steel tubes, channels or beams. A respective anchoring assembly 524, which in the illustrated example is formed solely of a steel cable in order to maximize the breaking strength and resilience of anchoring assembly 524, is disposed within each recess 520 and connected between a pair of anchoring devices 230 embedded in substrate 530. As discussed with respect to the previous embodiments, employing recesses 520 to protect anchoring assemblies 524 greatly reduces the likelihood of anchoring failure by partially shielding anchoring assemblies 520 from (and reducing exposure of anchoring assemblies 520 to) impact from wind-borne debris and from site-specific collapse, laydown, and rollover hazards.

Figure 6C:
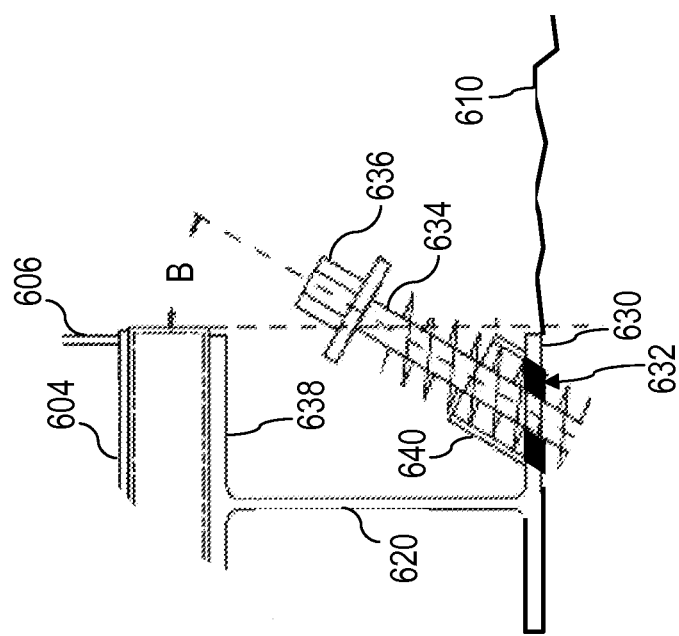

Referring now to FIGS. 6A-6C, there are respectively depicted a section view, a partial elevation view, and a detailed section view of a third embodiment of an aboveground shelter 600 having protected anchoring. In the depicted embodiment, aboveground protective shelter 600 includes an enclosure 602 having a floor 604, four sidewalls 606, and a roof 608 (in this case a curved roof), all formed of reinforced steel plate that is welded to form substantially air-tight connections between members. In the illustrated embodiment, floor 604 extends beyond enclosure 602 to form porches 605 extending from opposing ends of enclosure 602 along its long axis.

To permit ingress of personnel into and egress of personnel from the interior volume of enclosure 602, one or more (and preferably at least two) openings 612 are formed in sidewall(s) 606. As discussed above, opening(s) 612 can be protected by a hinged security door 614. Sidewalls 606 may be further provided with shielded ventilation and pressure relief opening(s) 616 of sufficient size to provide sufficient breathing air for the rated number of shelter occupants and pressure relief of the internal volume of enclosure 602 in accordance with the ICC/NSSA 500 Standard.

In the illustrated embodiment, floor 604 is welded, bolted or otherwise attached to and rests upon an undercarriage including one or more peripheral beams and/or rails that support protective shelter 600 on substrate 610. In the illustrated example, the undercarriage of protective shelter 600 includes two longitudinal C-channel or I-beams 620 extending along the long axis of enclosure 602. In the depicted embodiment, beams 620 are reinforced by one or more crossbeams 622, which may be, for example, welded between beams 620 at regular intervals along their length. In alternative embodiments, beams 620 can be attached to sidewalls 606 and run alongside enclosure 602 rather than under floor 604. In at least one of these alternative embodiments, floor 604 may rest directly on the underlying substrate 610.

As best seen in FIG. 6C, beams 620 include an outwardly facing lower flange 630 that rests on substrate 610. Lower flange 630 has a plurality of through holes 632 formed therein, which are sized to receive there through a respective anchoring device, such as an earth screw 634. In a preferred implementation, each through hole 630 is surrounded by an angled collar 640 projecting upwardly from lower flange 630 at an angle B. Angled collars 640 thus facilitate installation of earth screws 634 at an angle B that can be selected to optimize the holding strength of earth screws 634 while providing clearance of the heads 636 of earth screws 634 with respect to upper flange 638 of beams 620. In some preferred embodiments, angle B is between approximately 20 and 50 degrees, and more particularly, is approximately 30 degrees.

As will be appreciated, the number and required holding strength of the anchoring devices employed to resist sliding and overturning of protective shelter 600 will vary between embodiments and between installation conditions. Thus, for heavier shelter embodiments (e.g., 50,000 lbs.) that require less aggregate holding strength or for dense compacted clay soils that provide more securing anchoring, fewer anchoring devices spaced at a larger distance S and/or anchoring devices having a shorter length L can be employed while still providing the required holding strength. For lighter shelter embodiments (e.g., 30,000 lbs.) that require a greater aggregate holding strength or for sandy or loamy soils providing less securing anchoring, anchoring devices having a greater length L and/or a greater number of anchoring devices spaced at a lesser distance S are preferably employed. It can be appreciated that anchoring devices such as earth screws 634 are protected against impact from wind-borne debris and thus not susceptible to being severed like the anchoring assemblies 106 of the conventional "anchored box" design described above with respect to FIG. 1. Those skilled in the art will further appreciate that the holding strength provided by anchoring devices inserted through beams 620 can further be augmented by the protected anchoring assemblies described above with reference to FIGS. 2, 3A-3B, 4A-4B, and 5.

Figure 7:
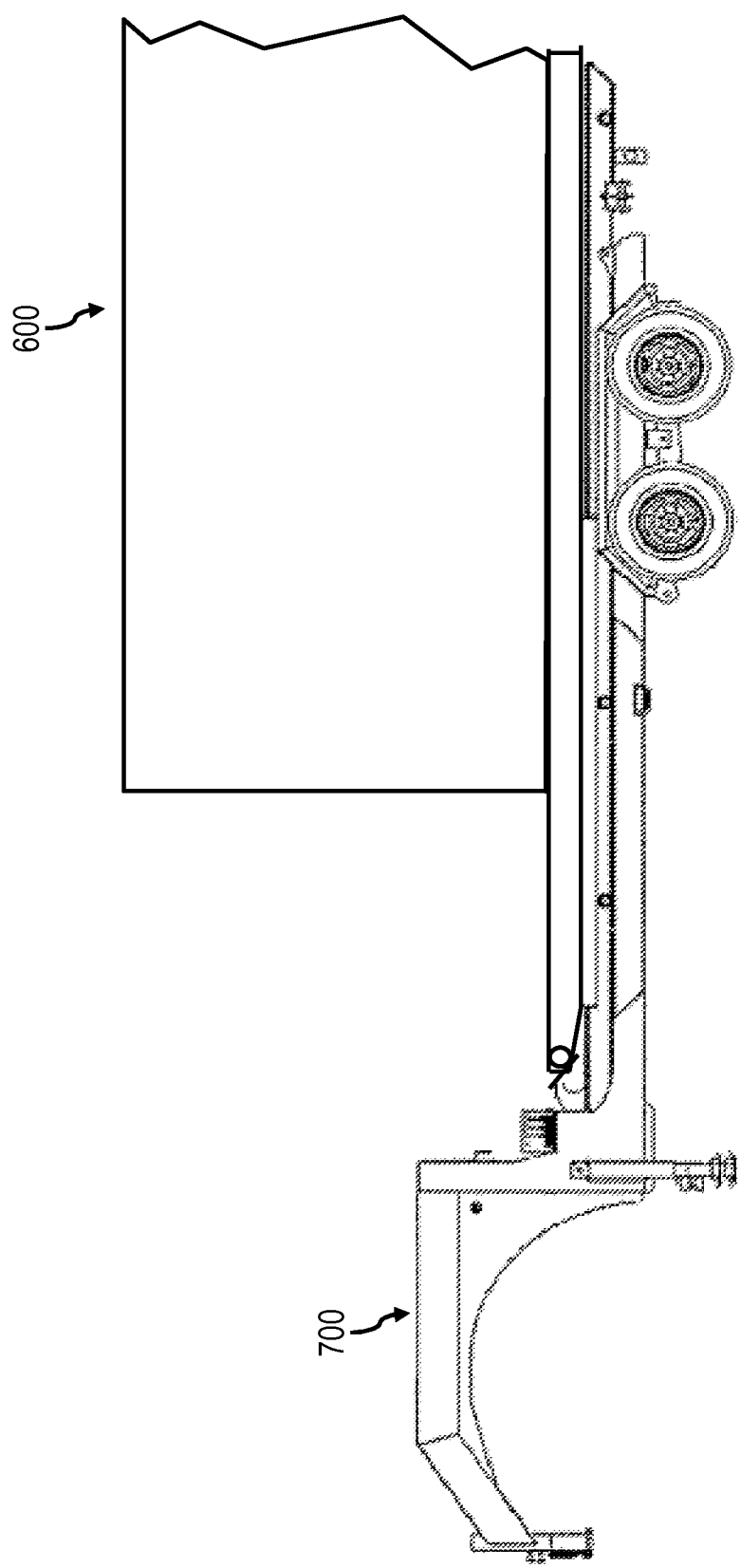
FIG. 7 is an exemplary embodiment of an assembly including a transport and an aboveground shelter that employs protected anchoring in accordance with one or more embodiments.

With reference now to FIG. 7, there is depicted an elevation view of an exemplary protective shelter (e.g., a protective shelter 600 as shown in FIGS. 6A-6C) ready for transport on a standardized roll-off container transport 700. In the depicted embodiment, the roll-off container transport is a conventional roll-off container trailer, such as model GN-20 or GN-30 available from Domatex Inc. of Houston, Texas. In an alternative embodiment, roll-off container transport 700 can be a roll-off container truck. However, the invention is not limited with regard to the mode of transport that can be implemented. For example, other types of transport include, but are not limited to a tractor truck, crane-truck, flat-bed truck, heavy hauler, tilt-bed Landoll with "pop-up" rollers and their similarly equipped semi-trailers. The assembly comprising the protective shelter 200, 300, 400, 500 or 600 and roll-off container transport 700 is preferably less than or equal to the maximum allowed DOT height, width and weight that may be traveled over public roadways without special permits or restrictions. However, in alternative embodiments, the assembly can be wider, taller and/or wider and/or longer than is allowed for non-permitted loads under state and/or federal transportation regulations.

Currently, the maximum unpermitted DOT-compliant height and width in the United States are 168 and 102 inches, respectively. Thus, it is preferable if the maximum height of the assembly is 168 inches or less, and the maximum width is 102 inches or less. A greater variation in the length of a protective enclosure is possible while still achieving DOT compliance without securing special permits. For example, a shelter with the maximum unpermitted DOT-compliant width can have a length shorter than 7 feet and as great as 25 feet or longer.

As has been described, a re-deployable mobile aboveground protective shelter is capable of protecting personnel and contents from environmental hazards, such as explosive blasts, lightning, high velocity wind events (e.g., winds exceeding 250 mph), and withstanding the uplifting, sliding and overturning forces generated by such high velocity wind events and potential collapse, laydown and rollover related hazards due to nearby structures and objects. In various embodiments, protective shelters may include:

An enclosure of a material and construction capable of protecting occupants and contents from high winds and the impact of wind-borne debris; and/or Standardized attachments, cable connections, undercarriage and supports allowing for the use of DOT-compliant roll-off container transport trailers and trucks and facilitating the economic and rapid loading, transportation, unloading and deployment of the protective shelter; and/or Recesses within sidewalls and/or protective covers that at least partially shield anchoring assemblies from impact from wind-borne debris and from site-specific collapse, laydown and rollover hazards; and/or Undercarriage beams having through holes for receiving anchoring devices.

In at least one embodiment, a protective shelter includes an enclosure having at least a floor, at least one sidewall coupled to the floor, a protected opening in the at least one sidewall, and a roof coupled to the at least one sidewall. The protective shelter includes a plurality of attachment fixtures each coupled to at least one of a set including the sidewall and the roof and a plurality of recesses at the at least one sidewall. Each of the plurality of recesses is sized to receive therein a anchoring assembly coupled to one of the plurality of attachment fixtures and couplable to a respective anchoring device on an underlying substrate.

While the present invention has been particularly shown as described with reference to one or more preferred embodiments, it will be understood by those skilled in the art that various changes in form and detail may be made therein without departing from the spirit and scope of the invention.

What is claimed is:

1. A protective shelter, comprising:
an enclosure having at least a floor, at least one sidewall coupled to the floor, a protected opening in the at least one sidewall, and a roof coupled to the at least one sidewall;
a plurality of recesses forming indentations in the at least one sidewall;
a plurality of attachment fixtures each housed in and coupled to the protective shelter in a respective one of the plurality of recesses such that the plurality of attachment fixtures do not project from the indentations in the at least one sidewall;
a plurality of protective covers coupled to the at least one sidewall, wherein each of the plurality of protective cover encloses a respective one of the plurality of recesses;
each of the plurality of protective covers is rotatably coupled to the at least one sidewall by at least one hinge; and
a plurality of anchoring assemblies each coupled to a respective one of the plurality of attachment fixtures and further couplable to a respective one of a plurality of anchoring devices on a substrate adjacent the protective shelter such that the plurality of attachment fixtures and the plurality of anchoring assemblies are protected by the plurality of recesses.

2. The protective shelter of claim 1, and further comprising an anchoring device coupled to one of the plurality of anchoring assemblies and further coupled to the substrate adjacent the protective shelter.

3. The protective shelter of claim 1, wherein at least one of the plurality of anchoring assemblies includes a non-rigid line coupled to a turnbuckle.

4. The protective shelter of claim 1, wherein the enclosure comprises metal plate.

5. The protective shelter of claim 1, and further comprising multiple peripheral beams coupled to the enclosure.

6. The protective shelter of claim 5, wherein the multiple peripheral beams have a plurality of through holes formed therein for receiving anchoring devices.

7. The protective shelter of claim 1, and further comprising a security door that protects the protected opening.

8. An assembly, comprising:
a protective shelter in accordance with claim 1; and
a transport bearing the protective shelter.

9. A method, comprising:
transporting a protective shelter to an installation site, including:
an enclosure having at least a floor, at least one sidewall coupled to the floor, a protected opening in the at least one sidewall, and a roof coupled to the at least one sidewall;
a plurality of protective covers coupled to the at least one sidewall, wherein each of the plurality of protective cover encloses a respective one of the plurality of recesses;
a plurality of recesses forming indentations in the at least one sidewall;
a plurality of attachment fixtures each housed in and coupled to the protective shelter in a respective one of the plurality of recesses such that the plurality of attachment fixtures do not project from the indentations in the at least one sidewall;
installing the protective shelter on a substrate at the installation site; and
coupling each of a plurality of anchoring assemblies to a respective one of the plurality of attachment fixtures and to a respective one of a plurality of anchoring devices coupled to a substrate adjacent the installation site, such that the plurality of anchoring assemblies are protected by the plurality of recesses.

10. The method of claim 9, and further comprising installing each of the plurality of anchoring devices adjacent a respective one of the plurality of recesses.

11. A protective shelter, comprising:
an enclosure having at least a floor, at least one sidewall coupled to the floor, a protected opening in the at least one sidewall, and a roof coupled to the at least one sidewall; and
multiple peripheral horizontal beams coupled to the enclosure, wherein each of the multiple peripheral horizontal beams has a respective lower outward facing flange adjacent an underlying substrate, wherein the lower outward facing flanges of multiple of the peripheral horizontal beams have a plurality of through holes formed therein for receiving anchoring devices that couple the protective shelter to the an underlying substrate, and wherein each of the plurality of through holes is surrounded by a respective angled collar projecting upwardly and outwardly from one of the lower outward facing flanges
a plurality of attachment fixtures each coupled to at least one of a set including sidewall and the roof;
a plurality of recesses at the at least one sidewall, wherein each of the plurality of recesses is sized to receive therein a anchoring assembly coupled to the plurality of attachment fixtures;
the plurality of recesses form indentations in the at least one sidewall;
the plurality of attachment fixtures are each housed in and coupled to the protective shelter in a respective one of the plurality of recesses such that the plurality of attachment fixtures do not project from the indentations in the at least one sidewall;
a plurality of protective covers coupled to the at least one sidewall, wherein each of the plurality of protective cover encloses a respective one of the plurality of recesses;
each of the plurality of protective covers is rotatably coupled to the at least one sidewall by at least one hinge.

12. The protective shelter of claim 1, wherein an attachment fixture among the plurality of attachment fixtures comprises a body having a hole formed therethrough that enables a respective one of the plurality of anchoring assemblies to be coupled to the attachment fixture.

13. The protective shelter of claim 12, wherein the attachment fixture comprises a metal plate disposed within the recess.

14. The protective shelter of claim 12, wherein the attachment fixture comprises an attachment ring disposed within the recess.

15. The protective shelter of claim 6, wherein:
the multiple peripheral horizontal beams each have a lower outward facing flange; and
the through holes are formed in the lower outward facing flanges of the multiple peripheral horizontal beams.

16. The protective shelter of claim 15, wherein each of the plurality of through holes is surrounded by a respective angled collar projecting upwardly and outwardly from one of the lower outward facing flanges.

\* \* \* \* \*